United States Patent
Ozaki et al.

[11] Patent Number: 5,930,538
[45] Date of Patent: Jul. 27, 1999

[54] DATA PRINTING DEVICE FOR CAMERA

[75] Inventors: Hiroyasu Ozaki; Shigeru Morishita; Kazunori Takahashi, all of Tokyo, Japan

[73] Assignee: Asahi Kogaku Kogyo Kabushiki Kaisha, Tokyo, Japan

[21] Appl. No.: 08/814,466

[22] Filed: Mar. 10, 1997

[30] Foreign Application Priority Data

Mar. 15, 1996 [JP] Japan .................................. 8-087349
Feb. 25, 1997 [JP] Japan .................................. 9-056993

[51] Int. Cl.$^6$ .................................................. G03B 17/24
[52] U.S. Cl. ........................ 396/310; 396/315; 396/317
[58] Field of Search .................................. 396/310, 315, 396/317

[56] References Cited

U.S. PATENT DOCUMENTS 5,678,084 10/1997 Hori ........................................ 396/317

Primary Examiner—Russell Adams
Attorney, Agent, or Firm—Greenblum & Bernstein P.L.C.

[57] ABSTRACT

A data printing device is provided which comprises a light emitting device that includes a plurality of light emitting elements, and an imaging optical system for forming light spots corresponding to the light emitting elements on the film. Preferably, the imaging optical system satisfies the following condition: $0.6<|m|<1.5$, where "m" represents the magnification of the imaging optical system. The light emitting device comprises a light emitting diode in which a plurality of light emitting elements are included on a single substrate. The plurality of light emitting elements are aligned along a straight line perpendicular to a direction of film winding. The imaging optical system includes of a single imaging lens or a plurality of lenses.

19 Claims, 2 Drawing Sheets

DATA PRINTING DEVICE FOR CAMERA

BACKGROUND OF THE INVENTION

The present invention relates to a data printing device used in a camera to print data such as date and/or time on a frame of a roll film.

A conventional data printing device includes a light emitting device and an imaging optical system. The light emitting device includes a plurality of LEDs (light emitting diodes) aligned along a line perpendicular to a winding direction of a roll film and the imaging optical system forms light points corresponding to the LEDs on the film. The LEDs are controlled in synchronism with winding of the roll film to print data, such as a date, as a dot matrix image.

In the conventional data printing device, the LEDs are independently fixed to a circuit board and, thus, a distance between adjacent LEDs must be relatively large due to the size of the packages of the LEDs. For example, the distance between light emitting points of adjacent LEDs is generally more than 0.5 mm. accordingly a distance between the light emitting points at the ends of a series of seven LEDs is at least 3.3 mm where the device includes seven LEDs.

On the other hand, the size of characters (letters) of the printed data should be limited within a range of about 0.4–0.7 mm in a direction perpendicular to the winding direction so that the printed data do not interfere with a picture on a developed photograph. Thus, the imaging optical system of the conventional device is a reducing optical system for which an imaging magnification is arranged within a range of about 0.1–0.2 times.

A problem arises in that the printing position on the film may vary depending on errors, such as a positioning error or a manufacturing error, relating to the imaging optical system. Further, the displacement of the printing position due to a given error increases as the magnification decreases. Thus, the error tolerance of a conventional device is low. Therefore, the imaging optical system of the conventional data printing device must be manufactured and positioned with higher accuracy in order to ensure a constant printing position; however, such measures increase the cost of assembling and manufacturing.

Particularly, since many parts of recent cameras are made from plastics, errors in the positioning of the imaging optical system are largely affected by shape errors generated during molding or deformations due to variations of temperature of the plastic parts.

SUMMARY OF THE INVENTION

It is therefore an object of the present invention to provide a data printing device for a camera in which the error tolerance in the imaging optical system is relatively larger, i.e., the displacement of the printing position due to errors is small.

In order to achieve the object of the invention, a data printing device comprises a light emitting device that includes a plurality of light emitting points, and an imaging optical system for forming light points corresponding to the light emitting points on the film. The imaging optical system satisfies the following condition:

0.6<|m|<1.5, where m is magnification of the imaging optical system.

Additionally, the plurality of light emitting points may be aligned along a straight line perpendicular to a direction of film winding.

Further, the light emitting device may comprise a light emitting diode in which a plurality of light emitting points are included on a single substrate.

Furthermore, the imaging optical system may consist of a single imaging lens or a plurality of lenses.

When the imaging optical system consists of the single imaging lens, the lens may be designed so that the light transmits through the lens without reflecting in the imaging lens or so that the light is reflected by the edge side surface of the imaging lens. It is preferable to form at least one of the incident and exit sides surfaces of the imaging lens as an aspherical surface.

When the imaging optical system includes first and second imaging lenses, an incident side surface and an exit side surface of the first imaging lens may be shifted with each other along a direction of film winding. In this case, the first imaging lens is provided with two reflecting surfaces at edge side surfaces between the incident side surface and the exit side surface. Furthermore, an incident side surface and an exit side surface of the second imaging lens may be shifted with each other along a direction of film winding. In that case, the second imaging lens is provided with two reflecting surfaces at edge side surfaces between the incident side surface and the exit side surface.

When the first and second imaging lenses are provided with two reflecting surfaces therein, the incident side surface of the first imaging lens and the exit side surface of the second imaging lens may be aligned with respect to the film winding direction, and the exit side surface of the first imaging lens and the incident side surface of the second imaging lens may be aligned with respect to the film winding direction.

DETAILED DESCRIPTION OF THE PREFERRED EMBODIMENTS

Figure 1:
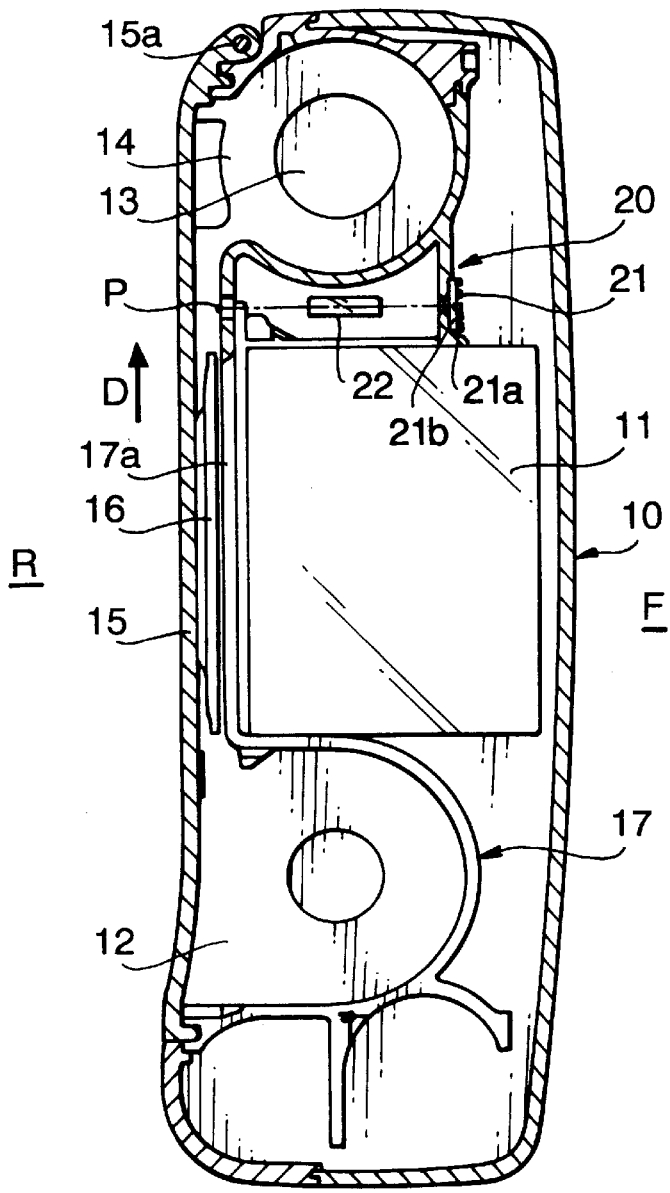
FIG. 1 is a sectional view of a camera to which a data printing device according to an aspect of the present invention is applied.

Preferred embodiments of a data printing device of the present invention are described herein with reference to a compact type camera. FIG. 1 shows the general arrangement of the camera. In the following description, a front side F is defined as a side of an object (right hand side in FIG. 1) and a rear side R is defined as opposite to the front side F (left hand side in FIG. 1).

The camera includes a camera body 10 and a back lid 15 that can rotate about a rotation axis 15a in order to close an opening at the rear side R of the camera body 10.

Formed within the camera body 10 are a lens space 11 where a zoom lens barrel (not shown) is installed (shown as a rectangular area in FIG. 1), a cartridge chamber 12 in which a film cartridge (not shown) is set and a spool chamber 14 where a spool 13 is arranged for winding film (not shown) pulled out from the film cartridge. The cartridge chamber 12 and the spool chamber 14 are arranged at the sides of the lens space 11 such that the film is wound in a film winding direction D that is perpendicular to the direction from the front side F to the rear side R of the camera. Further, in order to determine an exposure area of a film, an aperture (not shown) is provided at the rear side R of the lens space 11.

A pressure plate 16 is supported on the inner side of the back lid 15 via a plate spring (not shown). A pair of guide rails 17a, which extend between the cartridge chamber 12 and the spool chamber 14, are formed on a chassis 17, at the outside the aperture, opposite to the pressure plate 16 (i.e., to the rear side R of the lens space 11). The film is pushed against the guide rails 17a by the pressure plate 16. After a frame of the film, which is positioned at the rear side R of the aperture, is exposed, the film is wound in the film winding direction D as the spool 13 rotates.

A data printing device 20 is arranged between the lens space 11 and the spool chamber 14. The data printing device 20 includes a light emitting device 21 that is fixed to the front side of the chassis 17 and an imaging lens 22 as an imaging optical system. The light emitting device 21 includes a light emitting diode 21a that includes a plurality of light emitting points or elements on a single substrate and a cover glass 21b that covers a light emitting surface of the light emitting diode 21a.

Figure 2:
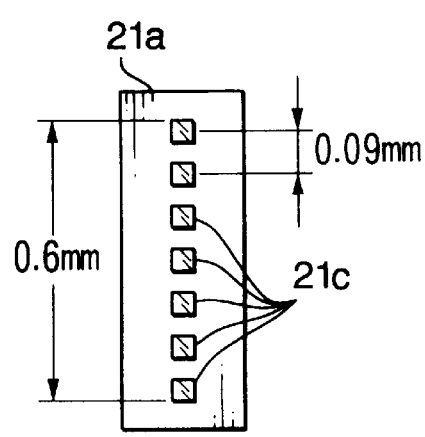
FIG. 2 is a schematic view showing the arrangement of the light emitting points on the light emitting device.

The light from each of the light emitting points is imaged on the film by means of the imaging lens 22 to form corresponding light points or spots at the film surface. The light emitting diode 21a includes, in this example, seven light emitting points 21c as shown in FIG. 2. The light emitting points 21c are aligned along a straight line, and the alignment direction is the same as that of the corresponding light points on the film. The alignment direction is perpendicular to the film winding direction D, i.e., perpendicular to the sheet of FIG. 1.

The light emitting device 21 is controlled such that each of the light emitting points 21c emits light in synchronism with the film winding in order to print character data on the film as a dot matrix image.

The printing position P is located at a point between the aperture and the spool chamber 14, that is, downstream of the photographing (exposure) position along the film winding direction D. Because the data (e.g., the date) is printed on the exposed frame after exposure (photographing), the data is printed during the winding of the film after shutter is released.

The position of the data printing device 20 in the disclosed embodiment is based on the assumption that the film is wound from the film cartridge after the exposure of each frame. However, the data printing device 20 of the embodiment is also effective for a "pre-loading" type camera in which film is first wound by a spool at the time when the film is set and the film is then rewound into a film cartridge after the exposure of each frame. In such a "pre-loading" type camera, the data printing device 20 could be positioned between the lens space 11 and the cartridge chamber 12. In this specification, the term "wind" describes the transfer of the film by a frame after each exposure (photographing operation).

In the case where the imaging optical system consists of the single imaging lens 22 without any reflecting surfaces, both the light emitting device 21 and the printing point P are positioned on the optical axis of the imaging lens 22 when they are viewed in FIG. 1.

The magnification m of the imaging optical system must satisfy the following relationship $$0.6<|m|<1.5.$$

An erected image is formed on the film when m has a positive value (m>0), and an inverted image is formed when m has a negative value (m<0). If the absolute value of the magnification |m| is smaller than 0.6, the distance between adjacent light emitting points (i.e., a point pitch) will be too large for a given character size (similar to the problem with the conventional device), and therefore the camera cannot be made compact and the error tolerance for the positioning error of the imaging optical system will be smaller. On the other hand, if the absolute value of the magnification |m| is larger than 1.5, a higher manufacturing accuracy will be required for the imaging optical system, because the distance between adjacent light emitting points will be too small requiring high resolution for the imaging optical system.

In this embodiment, the distance between adjacent light emitting points 21c is 0.09 mm and the distance between the light emitting points at the both ends is 0.6 mm as shown in FIG. 2. As described above, the size of characters (letters) of the printed data is limited within a range of about 0.4–0.7 mm in the direction perpendicular to the winding direction D and thus, the magnification of the imaging optical system is limited within a range of about 0.67<|m|<1.17 when the light emitting diode 21a is used. That is, the imaging optical system forms an approximately full-size image of the series of the light emitting points on the film. Thus, the shift of the printing position due to a manufacturing or assembling error with regard to the imaging lens 22 can be reduced as compared with a conventional device using a magnification of 0.1 or 0.2.

Hereinafter, three embodiments illustrating numerical examples of the imaging optical system that is applied to the data printing device of the present invention are described.

Figure 3:
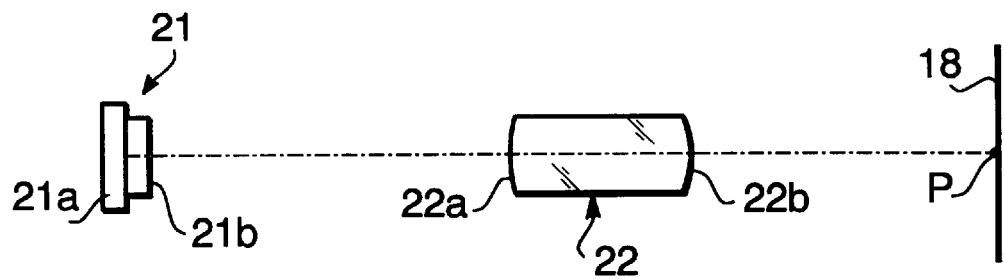
FIG. 3 shows an imaging optical system according to a first embodiment of the invention.
Figure 4:
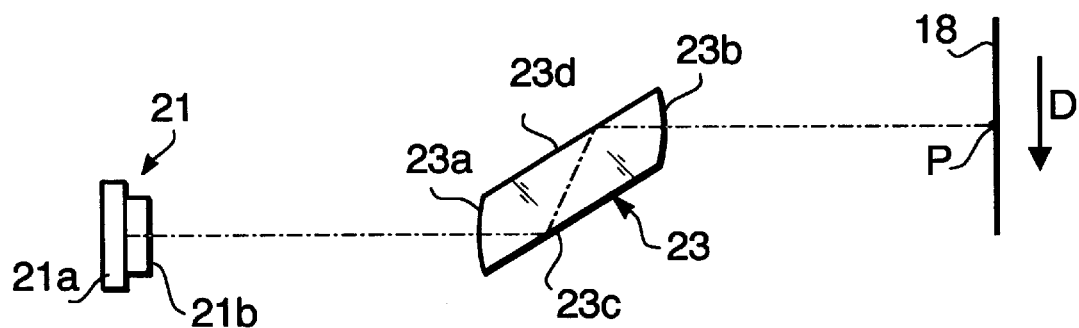
FIG. 4 shows an imaging optical system according to a second embodiment of the invention.
Figure 5:
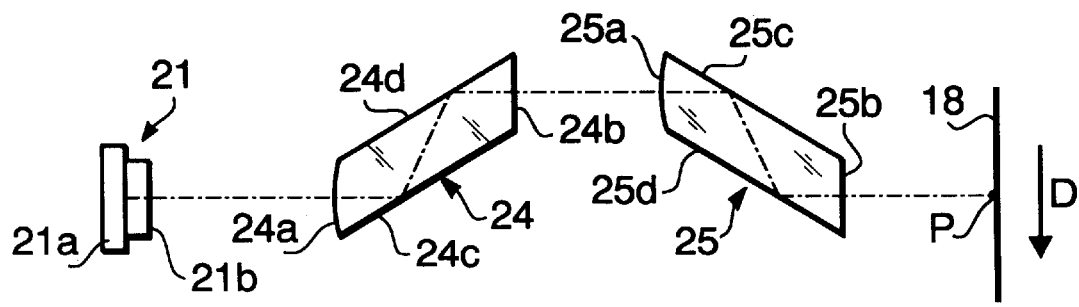
FIG. 5 shows an imaging optical system according to a third embodiment of the invention.

FIGS. 3 to 5 shows the arrangements of the imaging optical systems according to the first, second and third embodiments, respectively. In the drawings, a film surface 18 on which an image is to be formed is shown.

In the first embodiment, the imaging optical system consists of the single imaging lens 22, as shown in FIG. 3 (also shown in FIG. 1). The imaging lens 22 is provided with an incident side surface 22a through which the light from the light emitting device 21 enters and an exit side surface 22b through which the light exits toward the film 18. The light is not reflected in the imaging lens 22.

The imaging optical system of the second embodiment shown in FIG. 4 consists of a single imaging lens 23 of which an incident side surface 23a and an exit side surface 23b are shifted with respect to each other along the film winding direction D. In this case, the exit side surface 23b is shifted with respect to the incident side surface 23a in a direction opposite to the film winding direction D. However, alternatively and depending on the arrangement of the camera, the exit side surface 23b may be shifted in the same direction as the film winding direction D. In the second embodiment, a light from the light emitting device 21 is incident in the incident side surface 23a of the imaging lens 23 and is reflected twice at total internal reflecting surfaces 23c and 23d, then the reflected light exits from the exit side surface 23b toward the film 18.

The imaging optical system of the third embodiment shown in FIG. 5 consists of first and second imaging lenses 24 and 25. Each of the first and second imaging lenses is formed in a manner similar to the lens 23 of the second embodiment. The first imaging lens 24 includes two total internal reflecting surfaces 24c and 24d between the incident side surface 24a and the exit side surface 24b to shift the light path along the film winding direction D (in this case, in a direction opposite to the film winding direction D). The second imaging lens 25 also includes two total internal reflecting surfaces 25c and 25d between the incident side surface 25a and the exit side surface 25b to shift the light path along the film winding direction D (in this case, in the same direction as the film winding direction D). As an alternative arrangement, the first imaging lens 24 may be arranged to shift the light path in the same direction as the film winding direction D and the second imaging lens 25 may be arranged to shift the light path in a direction opposite to the film winding direction D.

In the third embodiment, the exit side surface 24b of the first imaging lens 24 and the incident side surface 25a of the second imaging lens 25 are aligned with each other with respect to the film winding direction D.

In the second and third embodiments, the data printing point P can be positioned more freely, without regard to the position of the light emitting device 21. Particularly, the construction of the third embodiment is effective in a case where the clearance between the lens space 11 and the spool chamber 13 is narrower than the arrangement shown in FIG. 1.

The numerical values for each of these embodiments are described in Tables 1, 2 and 3 respectively.

In the Tables, "R" denotes a radius of curvature of a surface (the values at the vertex for an aspherical surface), "d" denotes a distance between surfaces along the optical axis, "nd" denotes the refractive index at a wavelength of 588 nm and "vd" denotes an Abbe number.

In the Tables, the surface number "1" represents the light emitting surface of the light emitting device 21 and the surface number "2" represents the rear side R of the cover glass 21b, thus, the distance between the surface numbers 1 and 2 represents the thickness of the cover glass "21b". In the Tables 1 and 2, the surface number "3" represents the incident side surface 22a or 23a of the imaging lens 22 or 23, the surface number "4" represents the exit side surface 22b or 23b of the imaging lens, and the surface numbers represents the film 18. In the Table 3, the surface numbers "3 and 4" represent the incident side surface 24a and exit side surface 24b of the first imaging lens 24, the surface numbers "5 and 6" represent the incident side surface 25a and exit side surface 25b of the second imaging lens 25, and the surface number "7" represents the film 18.

The imaging optical system of each embodiment includes at least one aspherical surface in order to obtain enough performance (i.e., low aberration), even though only a small number of lenses is used. The exit side surface 22b of the imaging lens 22 in the first embodiment (fourth surface in Table 1), both incident and exit side surfaces 23a and 23b of the imaging lens 23 in the second embodiment (third and fourth surfaces in Table 2) and the exit side surface 24b of the first imaging lens 24 in the third embodiment (fourth surface in Table 3) are formed as rotationally symmetric aspherical surfaces.

An aspherical surface is expressed by the following equation:

$$X = \frac{CY^2}{1 + \sqrt{1 - (K+1)Y^2C^2}} + A_4Y^4$$

X is a SAG, that is, a distance of a curve from a plane, tangential to the curve at the optical axis, at a point where the height from the optical axis is Y. C is a curvature (1/r) of the top of the surface, K is a conic constant, and $A_4$ is an aspherical surface coefficient of fourth order. The constant K and coefficient $A_4$ are shown at the bottom of each Table.

TABLE 1 m = −0.75

| Surface number | r | d | nd | vd |
|---|---|---|---|---|
| 1 | ∞ | 0.62 | 1.49176 | 57.4 |
| 2 | ∞ | 9.64 | | |
| 3 | 8.673 | 5.00 | 1.49176 | 57.4 |
| 4 | −3.208 | 8.63 | | |
| 5 | ∞ | | | |

Aspherical data for the 4th surface: K = −1 $A_4$ = 2.76 × 10⁻³

TABLE 2 m = −1.00

| Surface number | r | d | nd | vd |
|---|---|---|---|---|
| 1 | ∞ | 0.62 | 1.49176 | 57.4 |
| 2 | ∞ | 8.74 | | |
| 3 | 4.500 | 6.50 | 1.49176 | 57.4 |
| 4 | −4.500 | 9.15 | | |
| 5 | ∞ | | | |

Aspherical data for the 3rd surface: K = −2.23 $A_4$ = 0
Aspherical data for the 4th surface: K = −2.23 $A_4$ = 0

TABLE 3 m = −1.15

| Surface number | r | d | nd | vd |
|---|---|---|---|---|
| 1 | ∞ | 0.62 | 1.49176 | 57.4 |
| 2 | ∞ | 4.87 | | |
| 3 | 4.799 | 6.80 | 1.49176 | 57.4 |
| 4 | −5.469 | 3.92 | | |
| 5 | 4.865 | 6.80 | 1.49176 | 57.4 |
| 6 | ∞ | 3.00 | | |
| 7 | ∞ | | | |

Aspherical data for the 4th surface: K = 1 $A_4$ = 1.90 × 10⁻³

In each of the embodiments, the image formed on the film 18 is an inverted image because the magnifications m have negative values (m<0). However, an erected image can also be formed by including an image rotating element in the imaging optical system. In order to increase the error tolerance of the imaging optical system only the absolute value of the magnification need be taken into consideration and the sign (plus or minus) of the magnification may be arbitrarily designed.

According to the present invention, since the magnification of the imaging optical system is set in a range from 0.6 to 1.5, the displacement of the light points on the film due to manufacturing and positioning errors of the imaging optical system can be reduced as compared with the conventional device. Thus, if the required accuracy for the light points on the film is identical with the conventional device, error tolerance for manufacturing error of a lens or a reflecting surface, or positioning error of an element is larger. That is, if the elements are manufactured and assembled at the same accuracy as for the conventional device, the light points on the film can be more accurately positioned.

The present disclosure relates to subject matter contained in Japanese Patent Application No. HEI 9-56993 filed on Mar. 15, 1996, and a Japanese Patent Application, entitled "Data Printing Device For Camera", filed on Feb. 25, 1997, which are expressly incorporated herein by reference in their entirety.

What is claimed is:

1. A data printing device of a camera for printing a data pattern on a film concurrently with a winding of said film, said device comprising:

a light emitting device that includes a plurality of light emitting elements; and an imaging optical system for forming light spots corresponding to said light emitting elements on said film, said imaging optical system satisfying the following condition;

$$0.6 < |m| < 1.5,$$

where m is magnification of said imaging optical system.

2. The data printing device according to claim 1, wherein said plurality of light emitting elements are aligned along a straight line.

3. The data printing device according to claim 2, wherein said light emitting device comprises a light emitting diode provided with a plurality of light emitting elements on a single substrate.

4. The data printing device according to claim 2, wherein said light elements are arranged along a line perpendicular to a direction of film winding.

5. The data printing device according to claim 1, wherein said imaging optical system consists of a single imaging lens that has an incident side surface through which the light from said light emitting device enters and an exit side surface through which the light exits toward said film.

6. The data printing device according to claim 5, wherein the light that enters into said imaging lens exits without reflecting in said imaging lens.

7. The data printing device according to claim 5, wherein said incident side surface and said exit side surface are shifted with respect to each other along a direction of film winding and said imaging lens is provided with two reflecting surfaces at edge side surfaces between said incident side surface and said exit side surface.

8. The data printing device according to claim 5, wherein one of said incident side surface and said exit side surface is formed as an aspherical surface.

9. The data printing device according to claim 5, wherein both of said incident side surface and said exit side surface are formed as aspherical surfaces.

10. The data printing device according to claim 1, wherein said imaging optical system consists of a plurality of lenses.

11. The data printing device according to claim 10, wherein said imaging optical system consists of first and second imaging lenses.

12. The data printing device according to claim 11, wherein an incident side surface and an exit side surface of said first imaging lens are shifted with respect to each other along a direction of film winding and said first imaging lens is provided with two reflecting surfaces at edge side surfaces between said incident side surface and said exit side surface.

13. The data printing device according to claim 12, wherein an incident side surface and an exit side surface of said second imaging lens are shifted with respect to each other along a direction of film winding and said second imaging lens is provided with two reflecting surfaces at edge side surfaces between said incident side surface and said exit side surface.

14. The data printing device according to claim 13, wherein said incident side surface of said first imaging lens and said exit side surface of said second imaging lens are aligned with each other with respect to said film winding direction, and wherein said exit side surface of said first imaging lens and said incident side surface of said second imaging lens are aligned with each other with respect to said film winding direction.

15. The data printing device according to claim 11, wherein at least one of said first and second imaging lenses include at least one aspherical surface.

16. The data printing device according to claim 1, wherein said imaging optical system forms said light spots as an approximately full-size image of said plurality of light emitting elements on said film.

17. The data printing device according to claim 10, wherein an incident side surface and an exit side surface of an element of said imaging optical system are shifted with respect to each other along a direction of film winding and said element of said imaging optical system is provided with two reflecting surfaces at edge side surfaces between said incident side surface and said exit side surface.

18. The data printing device according to claim 17, wherein said imaging optical system further includes a second element, an incident side surface and an exit side surface of said second element of said imaging optical system being shifted with respect to each other along a direction of film winding and said second element of said imaging optical system is provided with two reflecting surfaces at edge side surfaces between said incident side surface and said exit side surface.

19. The data printing device according to claim 18, wherein said incident side surface of said element of said imaging optical system and said exit side surface of said second element of said imaging optical system are aligned with each other with respect to said film winding direction, and wherein said exit side surface of said element of said imaging optical system and said incident side surface of said second element of said imaging optical system are aligned with each other with respect to said film winding direction.

* * * * *